US008009127B2

(12) United States Patent
Oh

(10) Patent No.: US 8,009,127 B2
(45) Date of Patent: Aug. 30, 2011

(54) ORGANIC LIGHT EMITTING DISPLAY DEVICE AND DRIVING METHOD FOR THE SAME

(75) Inventor: Eun Jung Oh, Seoul (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 1135 days.

(21) Appl. No.: 11/686,323

(22) Filed: Mar. 14, 2007

(65) Prior Publication Data

US 2007/0229398 A1 Oct. 4, 2007

(30) Foreign Application Priority Data

Mar. 29, 2006 (KR) ........................ 10-2006-0028615

(51) Int. Cl.

| | |
|---|---|
| ***G09G 3/30*** | (2006.01) |
| ***G09G 3/32*** | (2006.01) |
| ***G09G 5/10*** | (2006.01) |
| ***G09G 3/10*** | (2006.01) |
| ***G06F 3/038*** | (2006.01) |

(52) U.S. Cl. ............ 345/77; 345/82; 345/204; 345/207; 345/214; 345/690; 315/169.3

(58) Field of Classification Search .................... 345/39, 345/44–48, 76–84, 204–214, 690, 102; 313/463, 313/498; 315/169.3

See application file for complete search history.

(56) References Cited

U.S. PATENT DOCUMENTS

| | | | | |
|---|---|---|---|---|
| 6,995,753 | B2 * | 2/2006 | Yamazaki et al. | 345/204 |
| 7,166,966 | B2 * | 1/2007 | Naugler et al. | 315/149 |
| 7,538,749 | B2 * | 5/2009 | Chung et al. | 345/77 |
| 2005/0243077 | A1 * | 11/2005 | Chung et al. | 345/204 |

FOREIGN PATENT DOCUMENTS

| | | |
|---|---|---|
| KR | 2003-0075946 | 9/2003 |
| KR | 2003-0081610 | 10/2003 |
| KR | 2003-0095135 | 12/2003 |
| KR | 2003-0096878 | 12/2003 |
| KR | 10-2005-0073869 | 7/2005 |

(Continued)

OTHER PUBLICATIONS

Korean Patent Abstracts, Publication No. 1020030075946 A, dated Sep. 26, 2003, in the name of O Gyeong Kwon et al.

(Continued)

*Primary Examiner* — Lun-Yi Lao
*Assistant Examiner* — Sosina Abebe
(74) *Attorney, Agent, or Firm* — Christie, Parker & Hale, LLP

(57) ABSTRACT

An organic light emitting display device and a driving method for the same is provided. The device includes a pixel portion adapted to receive a scan signal and a data signal and display an image. A scan driver generates and applies the scan signal to the pixel portion. A data driver generates and applies the data signal and a pixel voltage to the pixel portion. When the device is operating in the normal mode, the data driver also applies a drive voltage to a photo sensor also included in the display device. The photo sensor adjusts a luminance of the pixel portion according to a sensed brightness of ambient light. When the device is operating in the power saving or stand-by mode, the data driver controls the drive voltage off and thereby prevents power consumption by the photo sensor.

8 Claims, 5 Drawing Sheets

FOREIGN PATENT DOCUMENTS

| | | |
|---|---|---|
| KR | 10-2006-0029856 | 4/2006 |

OTHER PUBLICATIONS

Korean Patent Abstracts, Publication No. 1020030081610 A, dated Oct. 22, 2003, in the name of Jun Yeong Song et al.

Korean Patent Abstracts, Publication No. 1020030095135 A, dated Dec. 18, 2003, in the name of O Gyeong Kwon.

Korean Patent Abstracts, Publication No. 1020030096878 A, dated Dec. 31, 2003, in the name of O Gyeong Kwon.

Korean Patent Abstracts, Publication No. 1020050073869 A; Date of Publication: Jul. 18, 2005; in the name of Min.

Korean Patent Abstracts, Publication No. 1020060029856 A; Date of Publication: Apr. 7, 2006; in the name of Kim et al.

* cited by examiner

ORGANIC LIGHT EMITTING DISPLAY DEVICE AND DRIVING METHOD FOR THE SAME

CROSS-REFERENCE TO RELATED APPLICATIONS

This application claims priority to and the benefit of Korean Patent Application No. 10-2006-0028615, filed on Mar. 29, 2006, in the Korean Intellectual Property Office, the entire content of which is incorporated herein by reference.

BACKGROUND

1. Field of the Invention

The present invention relates to an organic light emitting display device and a driving method for the same. More particularly, the present invention relates to an organic light emitting display device and a driving method for the same that operates a photo sensor according to the brightness of ambient light and controls the photo sensor on and off.

2. Discussion of Related Art

A flat panel display device includes a display region defined by a plurality of pixels arranged on a substrate in a form of a matrix, and displays an image by selectively applying a data signal to the pixels to which a scan line and a data line are connected.

A flat panel display device is classified into an active matrix type and a passive matrix type according to its drive type. In a point of resolution, contrast, and operation speed, the active matrix type flat panel display device, which selectively lights every unit pixel has been widely used. An organic light emitting display device is one such example of a flat panel display device. In some organic light emitting display devices, when the organic light emitting display device operates in a power saving mode or in a stand-by mode, it does not display an image but a photo sensor continues to operate therein, which leads to continuous power consumption.

SUMMARY OF THE INVENTION

One embodiment of the present invention provides an organic light emitting display device. The device includes a data driver, a photo sensor and a scan driver and a pixel portion. The device includes a data driver adapted to: receive an external voltage and generate a drive voltage. The data driver is also adapted to control on/off the drive voltage, wherein the drive voltage is controlled on when the organic light emitting display device is operating in normal mode and the drive voltage is controlled off when the organic light emitting display device is not operating in normal mode. The data driver is also adapted to generate and output a data signal. The photo sensor is adapted to: sense a brightness of an ambient light to determine a sensed brightness of the ambient light; receive the drive voltage output from the data driver; and output a brightness signal based on the sensed brightness of the ambient light. The scan driver is adapted to generate and transfer a scan signal. The pixel portion is adapted to: receive the data signal and the scan signal; receive the brightness signal; and display an image having a luminance indicative of the brightness signal.

In some embodiments, the data driver includes a control terminal for receiving the drive voltage. The drive voltage may also be a pixel voltage to drive the pixel portion.

In some embodiments, the photo sensor includes an optical sensing section adapted to output an analog sensing signal corresponding to the sensed brightness of the ambient light; an analog-to-digital converter adapted to convert the analog sensing signal from the optical sensing section into a digital sensing signal; and a counter adapted to count a predetermined number during one frame period and generate a corresponding counting signal. The photo sensor also includes a conversion processor adapted to output a control signal based on the digital sensing signal and the counting signal; a register generator adapted to divide the sensed brightness of the ambient light into a plurality of stages of brightness, and store a plurality of register set values corresponding to the plurality of stages of brightness. The photo sensor also includes a first selector adapted to select and output one of the plurality of register set values according to the control signal output from the conversion processor; and a gamma compensation circuit adapted to generate a gamma compensation signal according to the control signal output from the conversion processor.

In some embodiments, the photo sensor also includes a second selector adapted to provide an output for displaying an image after adjusting a luminance corresponding to the sensed brightness of the ambient light. The luminance of the image is adjusted according to the gamma compensation signal from the photo sensor. Further, the analog-to-digital converter compares a voltage of the analog sensing signal from the optical sensing section with a reference voltage to generate a compared result, and generates the digital sensing signal according to the compared result.

In another embodiment of the present invention, a method for driving an organic light emitting display device that adjusts a luminance according to an ambient light is provided. The method includes applying a first drive voltage to a photo sensor for outputting a signal corresponding to an ambient light. The method also includes adjusting a luminance according to the signal corresponding to the ambient light. The method also includes controlling off the drive voltage of the photo sensor when the organic light emitting display device operates in a power saving mode or in a stand-by mode.

In some embodiments, a data driver receives an external voltage and applies a pixel voltage to a pixel portion and also applies the pixel voltage of the pixel portion to the photo sensor.

DETAILED DESCRIPTION

Figure 1:
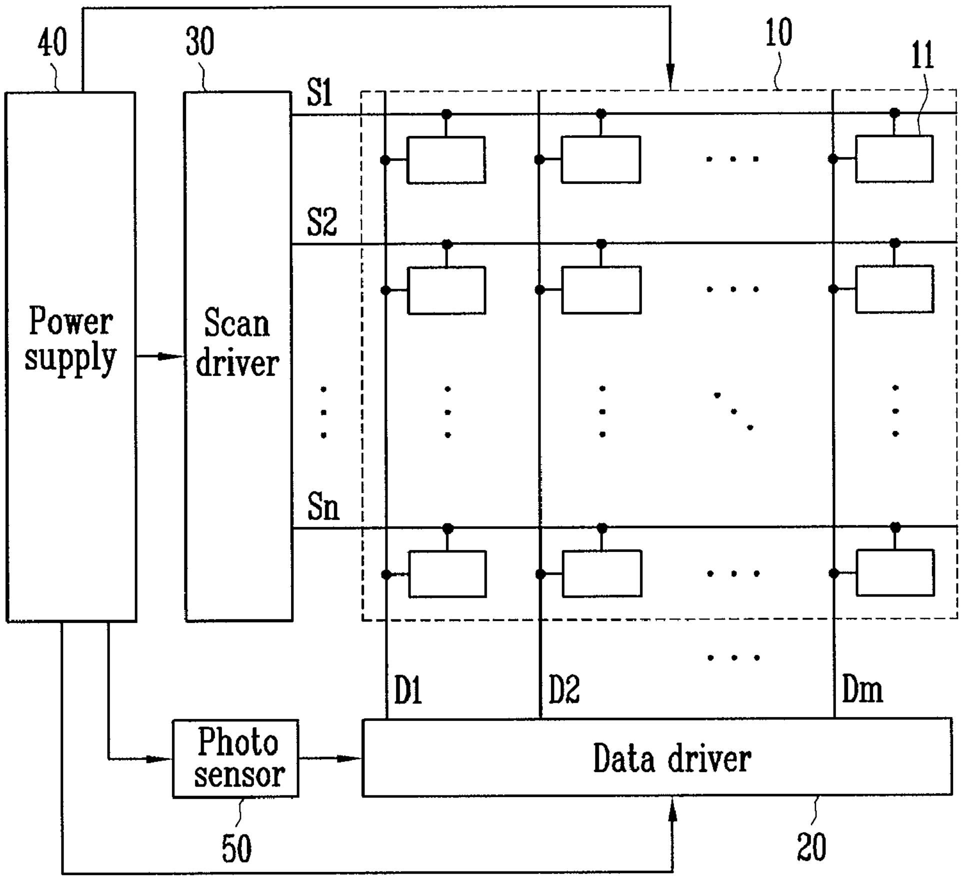
FIG. 1 (PRIOR ART)
FIG. 1 is a block diagram showing a conventional organic light emitting display device.

With reference to FIG. 1, an embodiment of a conventional organic light emitting display device includes a pixel portion 10, a data driver 20, a scan driver 30, a power supply 40 and a photo sensor 50. The pixel portion 10 includes a plurality of pixels 11, a plurality of scan lines S1, S2, . . . , Sn, and a plurality of data lines D1, D2, . . . , Dm. Each pixel 11 includes a pixel circuit (not shown) and a light emitting diode (not shown). The pixel circuit is connected to the scan lines S1, S2, . . . , Sn and the data lines D1, D2, . . . , Dm. The pixel circuit receives a scan signal and a data signal from the scan lines S1, S2, . . . , Sn and the data lines D1, D2, . . . , Dm, respectively, and applies them to the light emitting diode. When an electric current flows through the light emitting diode, the light emitting diode emits light according to a gradation value corresponding to the electric current.

The data driver 20 is connected to the plurality of data lines D1, D2, . . . , Dm, and applies a data signal to the pixel portion 10. The data signal is applied to one row of the pixel portion 10 in parallel.

The scan driver 30 is connected to the plurality of scan lines S1, S2, . . . , Sn. The scan driver 30 applies a scan signal to the pixel portion 10, thereby allowing a data signal to be applied to a row of the pixel portion selected by the scan signal.

The photo sensor 50 senses ambient light, and adjusts the luminance of the pixel portion 10 according to the sensed ambient light. Namely, when the ambient light is bright, the photo sensor 50 increases the luminance of the pixel portion 10. In contrast to this, when the ambient light is dark, the photo sensor 50 reduces the luminance of the pixel portion 10. This prevents a display of an image from becoming dark or bright due to the ambient light.

Figure 2:
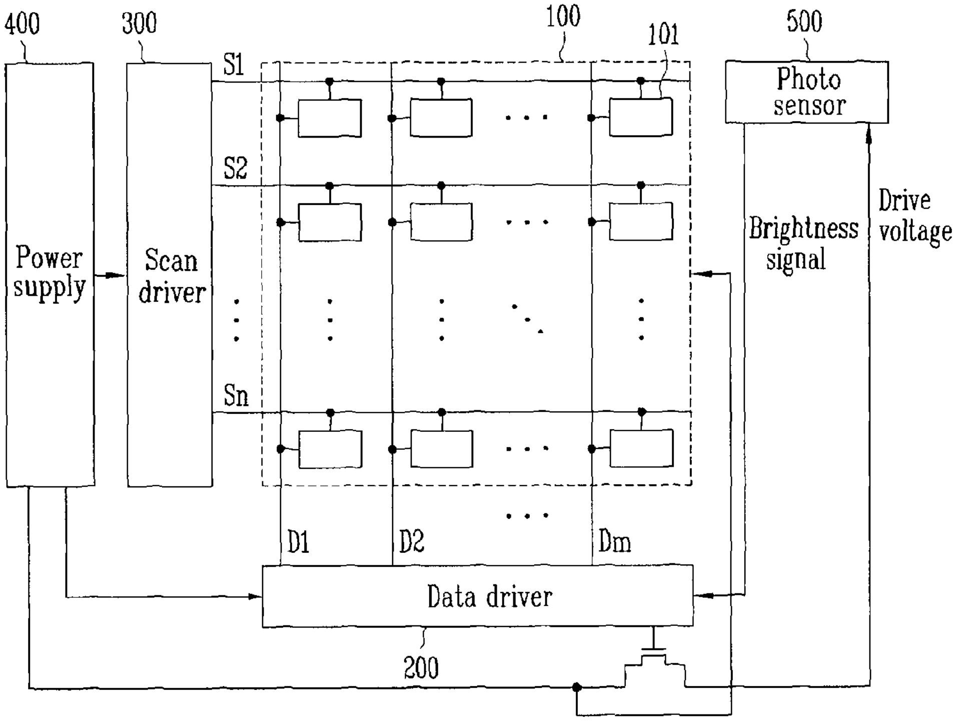
FIG. 2 is a block diagram showing an organic light emitting display device according to an embodiment of the present invention.
Figure 3:
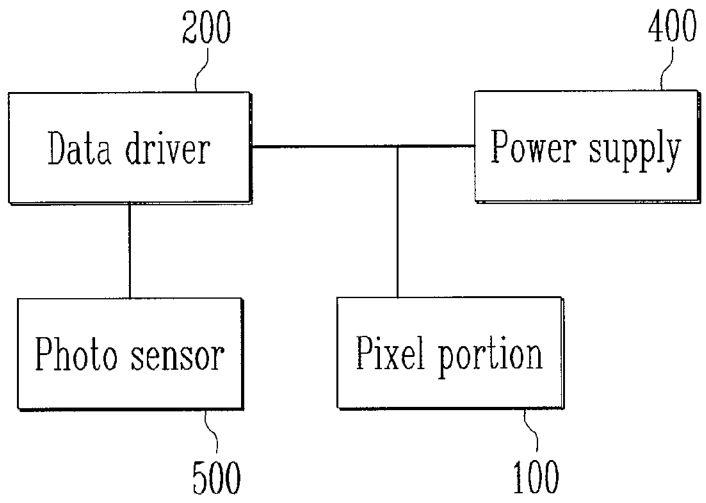
FIG. 3 is a block diagram showing a driving concept of a photo sensor.

FIG. 2 is a block diagram showing an organic light emitting display device according to an embodiment of the present invention. FIG. 3 is a simplified block diagram showing a driving concept of a photo sensor.

With reference to FIG. 2 and FIG. 3, the organic light emitting display device includes a pixel portion 100, a photo sensor 500, a data driver 200, and a scan driver 300. The pixel portion 100 includes a plurality of pixels 101, a plurality of scan lines S1, S2, . . . , Sn, and a plurality of data lines D1, D2, . . . , Dm. The pixel 101 includes a pixel circuit (not shown) and a light emitting diode (not shown). The pixel circuit is connected to the scan lines S1, S2, . . . , Sn and the data lines D1, D2, . . . , Dm. The pixel circuit receives a scan signal and a data signal from the scan lines S1, S2, . . . , Sn and the data lines D1, D2, . . . , Dn, respectively, and applies them to the light emitting diode. When an electric current flows through the light emitting diode, the light emitting diode emits light according to a gradation value corresponding to the electric current.

The photo sensor 500 measures the brightness of ambient light. When the ambient light is bright, the photo sensor 500 elevates the luminance of the pixel portion 100. When the ambient light is dark, the photo sensor 500 reduces the luminance of the pixel portion 100. These prevent the occurrence of dazzling. The photo sensor 500 receives a drive voltage from the pixel portion 100 through the data driver 200 and is operated by the drive voltage.

The data driver 200 is connected to the plurality of data lines D1, D2, . . . , Dm, and applies a data signal to the pixel portion 100. The data signal is applied to one row of the pixel portion 100 in parallel. Further, the data driver 200 applies a drive voltage to the photo sensor 500, and may intercept an external voltage thereby controlling off the drive voltage to control an operation of the photo sensor 500. That is, the data driver 200 intercepts the external voltage to prevent the drive voltage from being applied to the photo sensor 500 because it may unnecessarily adjust a luminance according to an ambient light when the organic light emitting display device operates in a power saving mode or in a stand-by mode. In contrast to this, when the organic light emitting display device operates in a normal mode, the data driver 200 applies the drive voltage to the photo sensor 500 to adjust the luminance according to the ambient light.

A pixel voltage (ELVdd) (not shown) applied to the pixel portion 100 may be used as the drive voltage that the data driver 200 applies to the photo sensor 500. In one embodiment, the pixel voltage is output from a power supply 400. The data driver 200 includes one of a plurality of terminals as a control terminal (not shown), and a power terminal (not shown) connected to pixel voltage (ELVdd). The data driver 200 may provide the pixel voltage to the pixel portion 100 through the data driver 200. Further, the data driver 200 controls an external voltage received through its control terminal to control application of the drive voltage to the photo sensor 500.

The reason why the data driver 200 receives and provides the pixel voltage applied to the pixel portion 100 to the photo sensor 500 is as follows. Since power consumption of the data driver 200 may be small, the voltage applied to the data driver 200 may be very small. Accordingly, the data driver 200 shares a drive voltage with the photo sensor 500. The difference between the power consumption of the data driver 200 and that of the photo sensor 500 is not large, with the result that the data driver 200 is unstably operated.

However, when the pixel portion 100 uses the pixel voltage (ELVdd) applied thereto, since it consumes greater power than that of the data driver 200 or the photo sensor 500, greater voltage should be supplied to the pixel portion 100. Accordingly, although the photo sensor 500 shares the pixel voltage (ELVdd) applied to the pixel portion 100 with the pixel portion 100, the power consumption of the photo sensor 500 is very small in comparison with that of the pixel portion 100. Unlike in the data driver 200, the pixel portion 100 is not influenced significantly to be unstably operated.

The scan driver 300 is connected to the plurality of scan lines S1, S2, . . . , Sn. The scan driver 300 applies a scan signal to the pixel portion 100. The data driver 200 applies a data signal to a row of the pixel portion selected by the scan signal.

Figure 4:
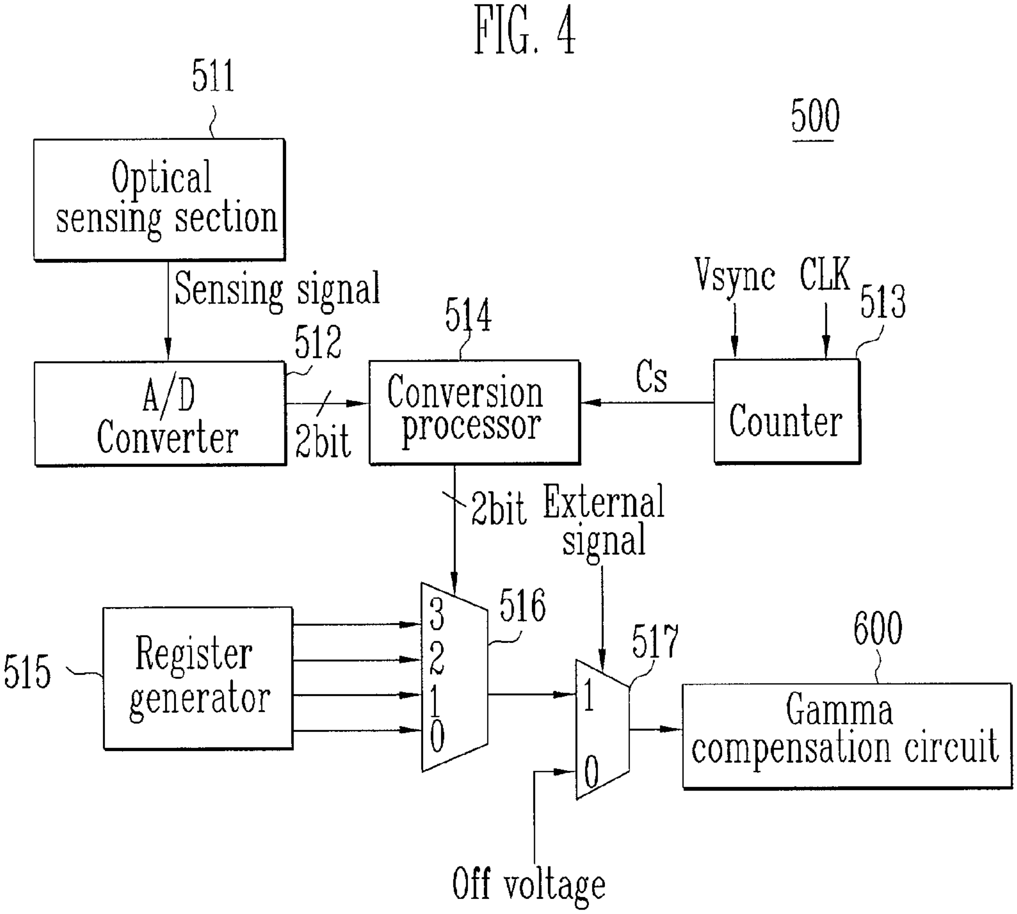
FIG. 4 is a block diagram showing an example of a photo sensor of the organic light emitting display device according to an embodiment of the present invention.

FIG. 4 is a block diagram showing a photo sensor of the organic light emitting display device according to an embodiment of the present invention. The photo sensor 500 includes an optical sensing section 511, an A/D converter 512, a counter 513, a conversion processor 514, a register generator 515, a first selector 516, a second selector 517, and a gamma compensation circuit 600.

The optical sensing section 511 measures the brightness of ambient light, divides it into a plurality of stages, and outputs an analog sensing signal corresponding to the stages. The A/D converter 512 compares the analog sensing signal from the optical sensing section 511 with a reference voltage, and outputs a digital sensing signal corresponding to the compared result. For example, when the brightness of the ambient light is in the brightest stage, the A/D converter 512 outputs a sensing signal of '11'. When the brightness of the ambient light is in a bright stage, the A/D converter 512 outputs a sensing signal of '10'. When the brightness of the ambient light is in a dark stage, the A/D converter 512 outputs a sensing signal of '01'. When the brightness of the ambient light is in the darkest stage, the A/D converter 512 outputs a sensing signal of '00'.

The counter 513 counts a predetermined number for a predetermined time period in response to an externally supplied vertical synchronous signal Vsync and outputs a corresponding counting signal Cs. In one embodiment, where the counter 513 uses a binary value of 2 bits, when the vertical synchronous signal Vsync is input to the counter 513, it is initialized as a value of '00'. Next, the counter 513 sequentially shifts a clock signal CLK and counts a number up to '11'. Then, the vertical synchronous signal Vsync is input to the counter 513, the counter 513 is reset as an initialization state. Through the aforementioned operation, the counter 513 sequentially counts the number from '00' to '11' during one frame period, and outputs a counting signal Cs corresponding to the counted number to a conversion processor 514.

The conversion processor 514 outputs a control signal to select a set value of each register based on the counting signal Cs from the counter 513 and the sensing signal from the A/D converter 512. Namely, when the counter 513 outputs a predetermined signal, the conversion processor 514 outputs a control signal corresponding to a selected sensing signal, and maintains a control signal output during one frame period. Next, the conversion processor 514 resets an output control signal when a next frame period comes. Then, the conversion processor 514 outputs a control signal corresponding to a sensing signal output from the A/D converter 512 and maintains it during one frame period. In one embodiment, when the ambient light is in a brightest state, the conversion processor 514 outputs a control signal corresponding to a sensing signal of '11', and maintains the control signal during one frame period when the counter 513 counts. When the ambient light is in a darkest state, the conversion processor 514 outputs a control signal corresponding to a sensing signal of '00', and maintains the control signal during one frame period when the counter 513 counts. Further, when an ambient light is in a bright state and a dark state, the conversion processor 514 outputs a control signal corresponding to a sensing signal of '10' and '01', respectively, and maintains the control signal during one frame period when the counter 513 counts.

The register generator 515 divides the brightness of the ambient light into a plurality of stages, and stores a plurality of set values corresponding to the stages.

The first selector 516 selects a register set value among a plurality of register set values stored in the register generator 515. The selected register set value corresponds to the control signal set by the conversion processor 514.

The second selector 517 receives an external set value of 1 bit to adjust the second selector 517 on/off. When '1' is selected, a brightness controller (not shown) starts an operation. When '0' is selected, an emission controller (not shown) is turned-off to selectively control a brightness according to an ambient light.

The gamma compensation circuit 600 generates a plurality of gamma compensation signals corresponding to a register set value selected according to the control signal set by the conversion processor 514. The control signal corresponds to the sensing signal output from the optical sensing section 511. The gamma compensation signals have different values according to the brightness of the ambient light. The aforementioned operation is performed for R, G, and B. Although it is shown that the gamma compensation circuit 600 is included in the photo sensor 500, in other embodiments, the gamma compensation circuit 600 may be configured to be separate from the photo sensor 500.

Further, referring to FIGS. 2 and 3, the photo sensor 500 having the aforementioned construction receives the drive voltage from the external voltage at the control terminal (not shown) of the data driver 200 and is operated by the received drive voltage.

Figure 5:
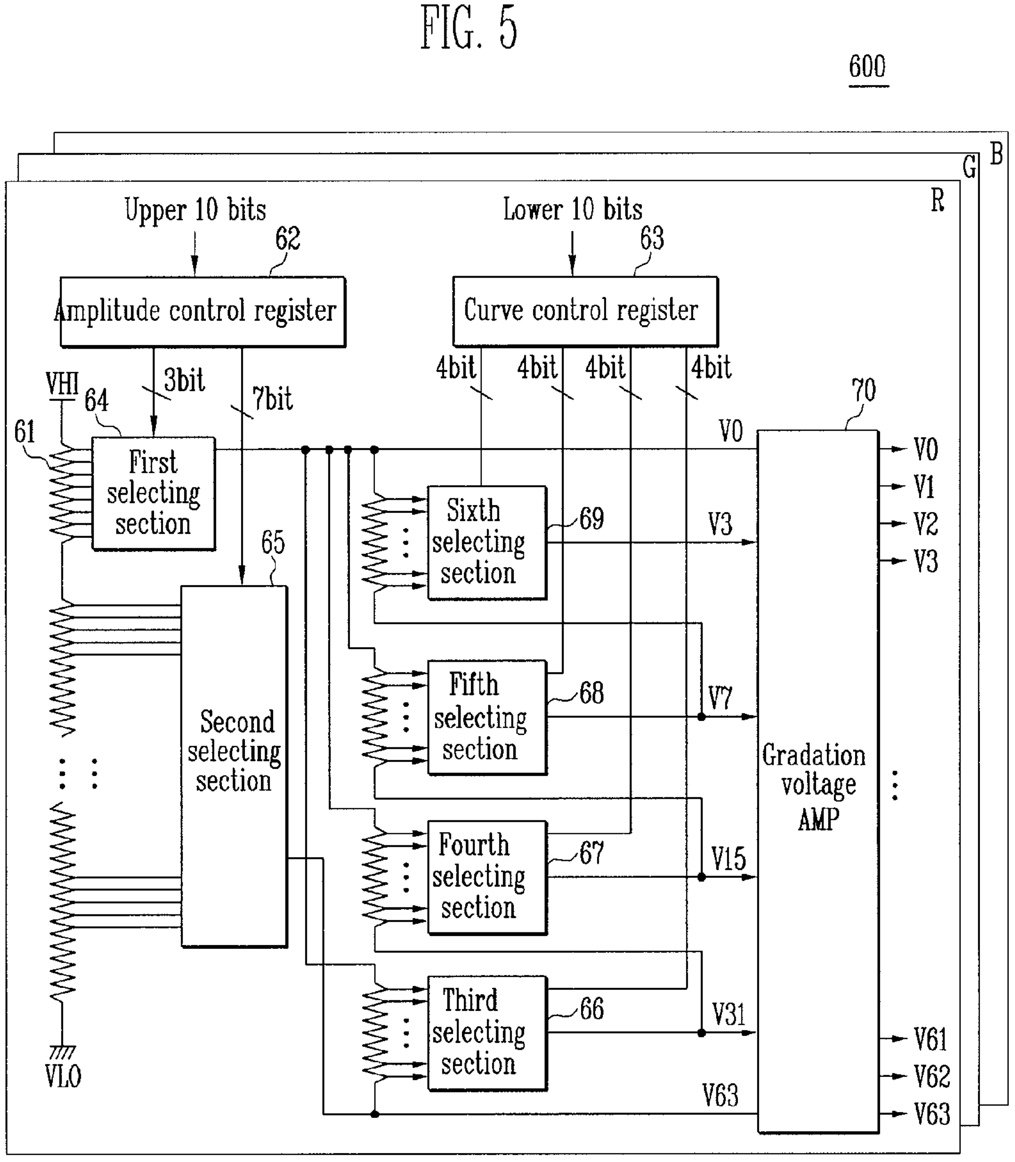
FIG. 5 is a block diagram showing an example of a gamma compensation circuit of the photo sensor shown in FIG. 4.

FIG. 5 is a block diagram showing an embodiment of the gamma compensation circuit of the photo sensor shown in FIG. 4. The gamma compensation circuit 600 includes a ladder resistor 61, an amplitude control register 62, a curve control register 63, a first selecting section 64, a second selecting section 65, a third selecting section 66, a fourth selecting section 67, a fifth selecting section 68, a sixth selecting section 69 and a gradation voltage amplifier 70.

The ladder resistor 61 generates a plurality of gradation voltages. The ladder resistor 61 includes a plurality of variable resistors between the lowest stage voltage VLO and a reference voltage to be serially connected to each other. The highest-stage voltage VHI is set as the reference voltage. Further, when a resistance value of the ladder resistor 61 is set to be small, a control range of an amplitude becomes less but a precision of the control amplitude is enhanced. In contrast to this, when a resistance value of the ladder resistor 61 is set to be great, a control range of an amplitude becomes greater but a precision of the control amplitude is deteriorated.

The amplitude control register 62 outputs a register set value of 3 bits to the first selecting section 64, and outputs a register set value of 7 bits to the second selecting section 65. An increase in the number of set bits may increase the number of gradation voltages that may be selected. A change in the register set value may select a different gradation voltage.

The curve control register 63 outputs a register set value of 4 bits to each of a first selecting section 64, a second selecting section 65, a third selecting section 66, a fourth selecting section 67, a fifth selecting section 68 and a sixth selecting section 69. The register set value can be changed, and a gradation voltage to be selected can be adjusted according to the register set value. Referring to FIGS. 4 and 5 upper 10 bits and lower 10 bits among register values generated by the register generator 515 are input to the amplitude control register 62 and the curve control register 63, respectively, and are selected as register set values.

The first selecting section 64 selects a gradation voltage corresponding to a register set value of 3 bits set by the amplitude control register 62 among a plurality of gradation voltages divided by the ladder resistor 61, and outputs it as the highest gradation voltage.

The second selecting section 65 selects a gradation voltage corresponding to a register set value of 7 bits set by the amplitude control register 62 among a plurality of gradation voltages divided by the ladder resistor 61, and outputs it as the lowest gradation voltage.

The third selecting section 66 divides a voltage between the highest gradation voltage from the first selecting section 64 and the lowest gradation voltage from the second selecting section 65 into a plurality gradation voltages through a plurality of resistor rows, and selects and outputs a gradation voltage corresponding to a register set value of 4 bits.

The fourth selecting section 67 divides a voltage between the highest gradation voltage from the first selecting section 64 and the gradation voltage from the third selecting section 66 into a plurality of gradation voltages through a plurality of resistor rows, and selects and outputs a gradation voltage corresponding to a register set value of 4 bits.

The fifth selecting section 68 selects and outputs a gradation voltage corresponding to a register set value of 4 bits among the output gradation voltages of the first and fourth selecting sections 64 and 67.

The sixth selecting section 69 selects and outputs a gradation voltage corresponding to a register set value of 4 bits among the output gradation voltages of the first and fifth selecting sections 64 and 68. In the aforementioned operation, a curve of a middle gradation part can be controlled according to a register set value of the curve control register 63 that allows gamma characteristics to be adjusted suited to the characteristics of respective light emitting diodes. Moreover, in order to make a gamma curve characteristic convex downwardly, a resistance of the ladder resistor 61 is adjusted to increase a potential difference between respective gradations as a small gradation is expressed. In contrast to this, so as to make a gamma curve characteristic convex upwardly, a resistance of the ladder resistor 61 is adjusted to reduce a potential difference between respective gradations as a small gradation is expressed.

The gradation voltage amplifier 70 outputs a plurality of gradation voltages corresponding to a plurality of gradation voltages to be expressed.

In consideration of fluctuations in characteristics of R, G, and B light emitting diodes, so as to have almost the same luminance characteristics in R, G, and B light emitting diodes, gamma compensation circuits are installed at the R, G, and B light emitting diodes so that an amplitude and a curve through a curve control register 63 and an amplitude control register 62 can be differently set according to the R, G, and B light emitting diodes.

Figure 6:
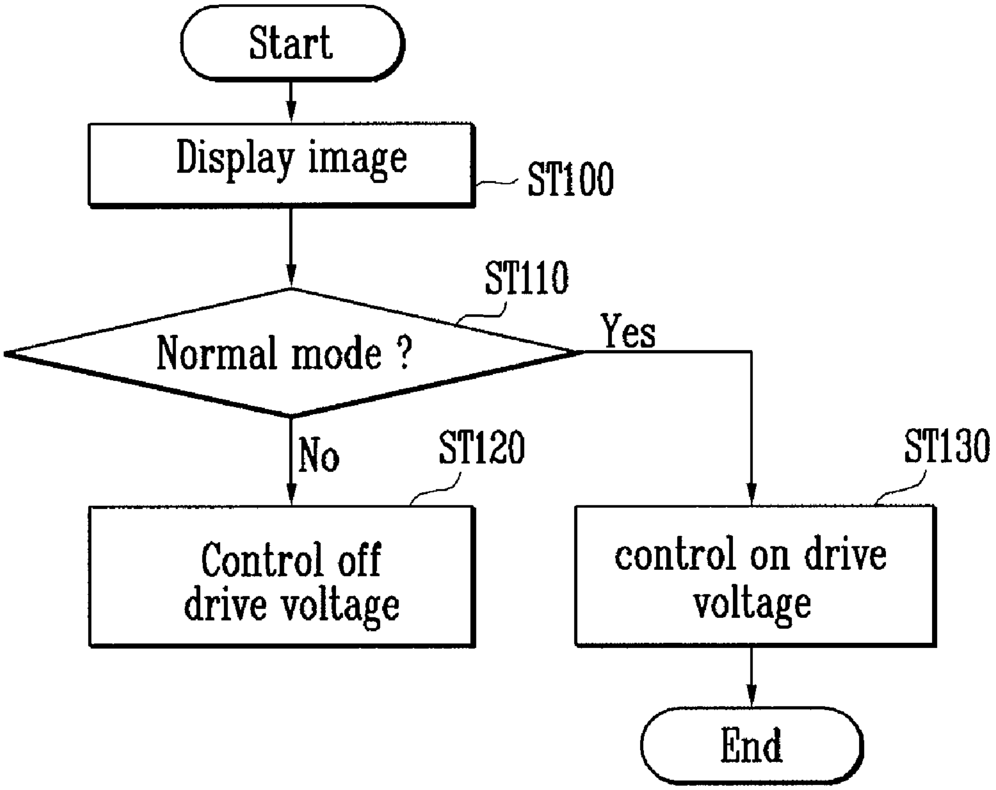
FIG. 6 is a flow chart showing a driving method of the organic light emitting display device according to an embodiment of the present invention.

FIG. 6 is a flow chart showing a driving method of the organic light emitting display device according to an embodiment of the present invention.

The organic light emitting display device displays (ST100) an image in one of a normal mode, a power saving mode or a stand-by mode. The normal mode is a mode for displaying an image. The power saving mode is a mode for reducing a power consumption using a limited amount of an electric current flowing through a pixel. During a process of expressing an image, when an external input does not occur for a predetermined time or more, it is determined that a user does not view a screen and the organic light emitting display device reduces a total luminance of a pixel portion to a value less than a predetermined value. This mode is referred to as "power saving mode."

It is determined (ST110) whether the organic light emitting display device is selected as one of the normal mode, the power saving mode or the stand-by mode. The power saving mode and the stand-by mode are modes to reduce power consumption. In the power saving mode and the stand-by mode, a luminance of the pixel portion is not controlled corresponding to an ambient light.

When the organic light emitting display device operates in the stand-by mode or the power saving mode, a supply of the drive voltage to the photo sensor is controlled off (ST120) thereby substantially preventing power of the photo sensor from being consumed when the organic light emitting display device is in the stand-by mode or the power saving mode.

When the organic light emitting display device operates in the normal mode, the drive voltage is controlled on and thereby supplied (ST130) to the photo sensor so that the organic light emitting display device may adjust a luminance corresponding to the ambient light. The photo sensor provides a signal corresponding to the ambient light.

In accordance with the organic light emitting display device and a driving method for the same of the present invention, a photo sensor adjusts luminance according to ambient light. Accordingly a visible angle of the organic light emitting display device may be increased. Furthermore, the present invention can control a drive voltage such that when the organic light emitting display device operates in a power saving mode or a stand-by mode, external voltage is intercepted and therefore a drive voltage is not applied to the photo sensor. Accordingly, the power consumption of the photo sensor is reduced.

Although exemplary embodiments of the present invention have been shown and described, it would be appreciated by those skilled in the art that changes might be made to these embodiments without departing from the principles and spirit of the invention, the scope of which is defined by the claims and their equivalents.

What is claimed is:

1. An organic light emitting display device, comprising:

a data driver adapted to:

receive an external voltage;

control a drive voltage to be on or off, wherein the drive voltage is controlled to be on when the organic light emitting display device is operating in a normal mode and the drive voltage is controlled to be off when the organic light emitting display device is not operating in the normal mode; and generate and output a data signal;

a photo sensor adapted to:

sense a brightness of an ambient light to determine a sensed brightness of the ambient light;

receive the drive voltage controlled by the data driver; and output a brightness signal based on the sensed brightness of the ambient light, the brightness signal being received by the data driver;

a scan driver adapted to generate and transfer a scan signal; and a pixel portion adapted to:

receive the data signal and the scan signal; and display an image having a luminance indicative of the brightness signal, wherein the photo sensor comprises:

an optical sensing section adapted to output an analog sensing signal corresponding to the sensed brightness of the ambient light;

an analog-to-digital converter adapted to convert the analog sensing signal from the optical sensing section into a digital sensing signal;

a counter adapted to count a predetermined number during one frame period and generate a corresponding counting signal;

a conversion processor adapted to output a control signal based on the digital sensing signal and the counting signal;

a register generator adapted to divide the sensed brightness of the ambient light into a plurality of stages of brightness, and store a plurality of register set values corresponding to the plurality of stages of brightness;

a first selector adapted to select and output one of the plurality of register set values according to the control signal output from the conversion processor; and a gamma compensation circuit adapted to generate a gamma compensation signal according to the control signal output from the conversion processor.

2. The organic light emitting display device as claimed in claim 1, wherein the data driver comprises a control terminal for receiving the external voltage.

3. The organic light emitting display device as claimed in claim 2, wherein the drive voltage is a pixel voltage to drive the pixel portion.

4. The organic light emitting display device as claimed in claim 1, wherein the photo sensor further comprises a second selector adapted to provide an output for displaying an image after adjusting the luminance corresponding to the sensed brightness of the ambient light.

5. The organic light emitting display device as claimed in claim 1, wherein the luminance is adjusted according to the gamma compensation signal from the photo sensor.

6. The organic light emitting display device as claimed in claim 1, wherein the analog-to-digital converter compares a voltage of the analog sensing signal from the optical sensing section with a reference voltage to generate a compared result, and generates the digital sensing signal according to the compared result.

7. A method for driving an organic light emitting display device that adjusts a luminance according to an ambient light, the method comprising:

controlling a drive voltage of a photo sensor to be on when the organic light emitting display device operates in a normal mode;

applying the drive voltage to a photo sensor for outputting a signal corresponding to an ambient light;

adjusting a luminance according to the signal corresponding to the ambient light; and controlling the drive voltage of the photo sensor to be off when the organic light emitting display device operates in a power saving mode or in a stand-by mode, wherein the photo sensor comprises:

an optical sensing section adapted to output an analog sensing signal corresponding to a sensed brightness of the ambient light;

an analog-to-digital converter adapted to convert the analog sensing signal from the optical sensing section into a digital sensing signal;

a counter adapted to count a predetermined number during one frame period and generate a corresponding counting signal;

a conversion processor adapted to output a control signal based on the digital sensing signal and the counting signal;

a register generator adapted to divide the sensed brightness of the ambient light into a plurality of stages of brightness, and store a plurality of register set values corresponding to the plurality of stages of brightness;

a first selector adapted to select and output one of the plurality of register set values according to the control signal output from the conversion processor; and a gamma compensation circuit adapted to generate a gamma compensation signal according to the control signal output from the conversion processor.

8. The method as claimed in claim 7, wherein a data driver also applies the drive voltage to a pixel portion.

* * * * *